(12) United States Patent
Certain

(10) Patent No.: US 7,530,232 B2
(45) Date of Patent: May 12, 2009

(54) METHOD FOR REGULATING THE FLOW RATE OF FUEL TO A TURBOSHAFT ENGINE IN ACCELERATION OR IN DECELERATION

(75) Inventor: Bernard Certain, Aix en Provence (FR)

(73) Assignee: Eurocopter, Marignane (FR)

( * ) Notice: Subject to any disclaimer, the term of this patent is extended or adjusted under 35 U.S.C. 154(b) by 358 days.

(21) Appl. No.: 11/115,277

(22) Filed: Apr. 27, 2005

(65) Prior Publication Data
US 2005/0262825 A1 Dec. 1, 2005

(30) Foreign Application Priority Data
Apr. 28, 2004 (FR) .................................. 04 04532

(51) Int. Cl.
*F02C 9/28* (2006.01)
(52) U.S. Cl. ..................... 60/773; 60/39.281
(58) Field of Classification Search ............. 60/39.27, 60/39.281, 773, 774, 791
See application file for complete search history.

(56) References Cited

U.S. PATENT DOCUMENTS 3,777,479 A * 12/1973 Hagen .................. 60/39.281
4,173,119 A * 11/1979 Greune et al. ............. 60/791
4,266,401 A * 5/1981 Sumegi et al. ............ 60/791

* cited by examiner

*Primary Examiner*—Louis J Casaregola
(74) *Attorney, Agent, or Firm*—Young & Thompson

(57) ABSTRACT

Apparatus for regulating the flow rate of fuel to a turboshaft engine in acceleration or deceleration, the engine having a free turbine and a core engine, the apparatus including sensors transmitting information to regulator elements, the information relating: to a first speed of rotation NTL of the free turbine; to a second speed of rotation Ng of the engine's gas generator; to an internal temperature T4 of the gas at the inlet to the free turbine; to the external pressure; and to the external temperature. The apparatus further includes control elements activated by the regulator to actuate a fuel metering system of the engine. The regulator evaluates the flow rate of fuel to be supplied to the engine in acceleration or deceleration on the basis of at least one optimum regulation relationship, which determines a main modulated flow rate as a function of a modulated speed of rotation.

16 Claims, 1 Drawing Sheet

METHOD FOR REGULATING THE FLOW RATE OF FUEL TO A TURBOSHAFT ENGINE IN ACCELERATION OR IN DECELERATION

The present invention relates to apparatus and to a method of regulating the flow rate of fuel to a turboshaft engine of a rotorcraft enabling acceleration, or deceleration, or indeed acceleration and deceleration, of said engine to be well controlled.

BACKGROUND OF THE INVENTION

This type of turboshaft engine is fitted with a regulator system whose main function is to regulate the power delivered by the engine during flight by controlling the fuel flow rate. The speed of rotation of the main rotor for providing the rotorcraft with drive and lift is then maintained at a value that is substantially constant.

A rotorcraft is controlled in particular by acting on the pitch of blades of said main rotor. An increase in pitch leads to the speed of rotation of the rotor falling off quickly. The engine must then accelerate quickly so as to compensate for this drop in speed in order to enable the rotorcraft to be maintained in flight. Similarly, when the blade pitch is reduced, it is necessary to decelerate the engine so that the speed of rotation of the rotor does not exceed a limit determined by the manufacturer.

In addition, the fuel flow rate must be regulated scrupulously in such a manner as to ensure that the main rotor can absorb an increase in power without running the risk of engine pumping. Pumping is a phenomenon that affects the compressors of turboshaft engines when the angle of incidence of a rotor blade or of a rectifier becomes locally too great, leading to aerodynamic separation (stalling) which considerably reduces the air flow rate. A consequence of this phenomenon is overheating in the combustion chamber which can lead to deterioration of the turbine of the engine.

Similarly, deceleration must also be controlled so as to avoid engine flameout.

An electronic regulator apparatus is known to the person skilled in the art under the name FADEC (full authority digital engine control). Regulation relationships, e.g. for acceleration or deceleration, are programmed in the FADEC so as to enable it to regulate the fuel flow rate without running any risk of pumping or of flameout for the engine.

In addition, the FADEC receives signals from sensors that measure various parameters of the engine, in particular pressure at the outlet from the compressor stages, the speed of the engine's gas generator, the speed of the free turbine, and the internal temperature at the inlet to the free turbine, which parameters are respectively written P3, Ng, NTL, and T4 by the person skilled in the art. As a function of this information, the FADEC makes use of regulation relationships for controlling an actuator that adjusts the fuel flow rate. by acting on the setting of the engine's fuel metering system.

That apparatus gives satisfaction, but it is not sufficiently reliable on its own to guarantee safe flight. Backup systems therefore need to be installed on the rotorcraft in order to remedy this drawback.

The regulation relationship used for rotorcraft turboshaft engines depend on the quotient of the fuel flow rate divided by the pressure P3. The justification of this principle lies in its stabilizing nature since, in the event of pumping, the pressure P3 drops, and thus causes the fuel flow rate to be lowered, which often makes it possible to escape from the phenomenon. Unfortunately, experience shows that the sensor for sensing the pressure P3 is particularly fragile and is at the root of many anomalies.

OBJECTS AND SUMMARY OF THE INVENTION

An object of the present invention is to propose apparatus enabling the reliability of a fuel flow rate regulator for a rotorcraft turboshaft engine to be increased by using regulation relationships of a novel type that do not depend on the pressure P3.

In the invention, apparatus for regulating the flow rate of fuel delivered during acceleration or deceleration to a turboshaft engine having a free turbine and a engine's gas generator comprises sensors that transmit information to regulator means, the information relating: to a first speed of rotation NTL of said free turbine; to a second speed of rotation Ng of said engine's gas generator; to an internal temperature T4 of the gas at the inlet to the free turbine; to the external pressure; and to the external temperature. The apparatus further comprises control means activated by said regulator means to actuate a fuel metering system of the engine.

The apparatus of the invention is remarkable in that the regulator means evaluates the rate at which fuel is to be supplied to the engine in acceleration or in deceleration from at least one optimum regulation relationship, said optimum regulation relationship determining a main modulated flow rate as a function of a modulated speed of rotation, the main modulated flow rate depending on the external temperature and on the external pressure, while the modulated speed of rotation corresponds to the second speed of rotation Ng modulated by the external temperature. Depending on the situation, the regulator means uses an optimum regulation relationship in acceleration or in deceleration.

The sensor for sensing the pressure P3 is thus not involved in regulating the fuel flow rate, thus making it possible to increase the reliability of the apparatus significantly.

In addition, the main modulated flow rate is advantageously equal to a primary modulated flow rate. This primary modulated flow rate is obtained by the following first relationship in which CH' represents the primary modulated flow rate, CH represents the flow rate of fuel delivered to the engine, P0 represents the external pressure, T0 represents the external temperature, α represents a first power, and β represents a second power:

$$CH' = CH\left(\frac{1013}{P0}\right)^{\alpha}\left(\frac{288}{T0}\right)^{\beta}$$

The first and second powers α and β depend exclusively on the type of engine. Experience shows that regulation of fuel flow rate is optimized during acceleration with a first power α lying in the range 0.9 to 1.05, and a second power β lying in the range 0.6 to 0.9.

It is shown below that using the primary modulated flow rate implies using a plurality of optimum regulation relationships in acceleration and in deceleration, with each relationship being associated with an altitude.

In contrast, a single optimum regulation relationship that is optimal in acceleration and a single optimum regulation relationship in deceleration, each valid at any altitude, are obtained when the main modulated flow rate is equal to a secondary modulated flow rate. This secondary modulated flow rate is then obtained by the following second relationship in which CH" represents the secondary modulated flow rate, CH' represents the primary modulated flow rate, and T0 represents the external temperature:

$$CH'' = CH'\left(\frac{288}{T0}\right)$$

Given the above-described first relationship, this second relationship can also be written as follows:

$$CH'' = CH\left(\frac{1013}{P0}\right)^{\alpha}\left(\frac{288}{T0}\right)^{\beta+1}$$

Furthermore, the above-described apparatus makes it possible in theory to avoid pumping or flameout of the engine insofar as the fuel flow rate is properly controlled. Nevertheless, the optimum regulation relationships are determined by testing performed on an engine that is new. Unfortunately, with wear (transmission shaft brake, damaged compressor blades, ... ), the performance of the engine becomes degraded and that can lead to pumping or to flameout.

To avoid flameout, the control means, e.g. a stepper motor, possesses a bottom limit, thereby guaranteeing at least some minimum flow rate of fuel to the engine. In addition, in order to increase safety, the fuel metering system also has a bottom limit.

For engine pumping, it is observed both before and after this phenomenon, that the internal temperature T4 becomes abnormally high. Under such conditions, a limit based on said internal temperature T4 can serve to solve the problem by anticipating it.

Under such conditions, the regulator means limit the increase in the fuel flow rate when the time derivative of said internal temperature reaches a value equal to a predetermined threshold.

In addition, in a graph where internal temperature T4 is plotted along the abscissa and the time derivative of the internal temperature T4 is plotted up the ordinate, this predetermined threshold corresponds to a limit line having the equation:

$$T4 + k\frac{d}{dt}(T4) = T4\text{max}$$

where k and T4 max are constants evaluated by testing for each turboshaft engine.

The present invention also provides a method of limiting the increase in the fuel flow rate of a turboshaft engine when the predetermined threshold is reached.

According to the invention, the method is remarkable in that:
when the time derivative of the internal temperature T4 has a value not less than the predetermined threshold, regulation means freezes the fuel flow rate for a first duration t1;
at the end of the first duration t1, and for a second duration t2, the regulator means evaluates the flow rate of fuel to be supplied to the engine from at least one degraded regulation relationship; and
at the end of the second duration t2, the regulation means evaluates the flow rate of fuel to be supplied to the engine from the optimum regulation relationship.

In addition, the plot of this degraded regulation relationship is geometrically similar to the plot of the optimum regulation relationship in acceleration, while remaining higher than the plot of a regulation relationship for normal operation.

In a variant of the method, at the end of the first duration t1, the regulation means evaluates the flow rate of fuel to be delivered to the engine from the optimum regulation relationship in acceleration.

BRIEF DESCRIPTION OF THE DRAWINGS

The invention and its advantages appear in greater detail from the following description of two embodiments given by way of illustration with reference to the accompanying figures, in which.

MORE DETAILED DESCRIPTION

Elements present on a plurality of distinct figures are given the same reference throughout.

Figure 1:
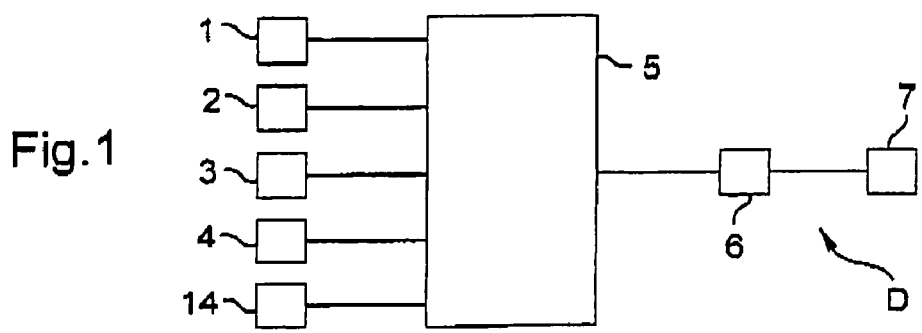
FIG. 1 is a block diagram of apparatus of the invention.

FIG. 1 is a diagrammatic view of apparatus D of the invention.

The apparatus D comprises sensors 1, 2, 3, 4, and 14, regulator means 5, control means 6, and a fuel metering system 7.

The sensors 1, 2, 3, 4, and 14 transmit information to the regulator means 5 relating respectively to the following:
a first speed of rotation NTL of the free turbine of a turboshaft engine;
a second speed of rotation Ng of the engine's gas generator of the turboshaft engine;
an internal temperature T4 of the gas at the inlet to the free turbine of the turboshaft engine;
the external pressure written P0 by the person skilled in the art; and
the external temperature written T0 by the person skilled in the art.

The sensor 1 measures the first speed of rotation NTL. This speed is proportional to the substantially constant speed of rotation of the main rotor serving to support the rotorcraft and to enable it to move.

Furthermore, a first setpoint, corresponding to the value which the first speed of rotation NTL needs to have for the speed of rotation of the main rotor to be ideal is set by the manufacturer.

As a result, if the first speed of rotation NTL differs from this first setpoint, the regulator means 5 accelerate or decelerate the turboshaft engine to obtain the ideal speed of rotation of the rotor.

Under such conditions, the regulator means 5 determine a second setpoint. This setpoint corresponds to the value which the second speed of rotation Ng needs to reach in order to cause the first speed of rotation NTL to be equal to the first setpoint.

The regulator means 5 then makes use of the information delivered by the sensors 2, 3, 4, and 14, and of its regulation programs (optimum regulation relationships in deceleration or in acceleration, bottom limit or predetermined threshold) in order to determine the rate at which fuel should be delivered to the engine. Any increase or decrease in the fuel delivery rate will be stopped once the second speed of rotation Ng reaches the second setpoint.

Figure 2:
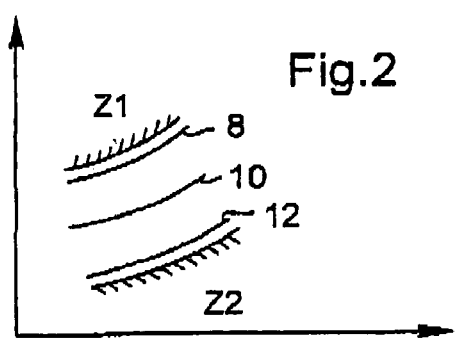
FIG. 2 is a graph showing the optimum regulation relationships in acceleration and in deceleration.

FIG. 2 is a graph showing the optimum regulation relationships in acceleration 8 and in deceleration 12, defining a main modulated flow rate as a function of a modulated speed of rotation. In this graph, the main modulated fuel flow rate is plotted up the ordinate, and the modulated speed of rotation is plotted along the abscissa. It is shown below that the main modulated flow rate can be equal to a primary or a secondary modulated flow rate. Furthermore, the modulated speed of rotation, written Ng' for convenience in the text below, is determined by the following formula:

$$Ng' = Ng\sqrt{\frac{288}{T0}}$$

The shaded zone Z1 represents the zone in which the phenomenon of engine pumping appears. In contrast, the shaded zone Z2 represents the engine flameout zone in which the engine goes out because of an insufficient supply of fuel.

In order to protect the engine, the manufacturer performs testing to determine a regulation relationship 10 for normal operation, at least one optimum regulation relationship 8 in acceleration, and at least one optimum regulation relationship 12 in deceleration. These three relationships determine the main modulated flow rate as a function of the modulated speed of rotation Ng', and they enable the regulator means 5 to evaluate the rate at which fuel should be delivered to the engine.

In addition, the optimum regulation relationships in acceleration 8 and in deceleration 12 are close respectively to the zones Z1 and Z2 but remain spaced apart from them so as to conserve a safety margin.

Figure 3:
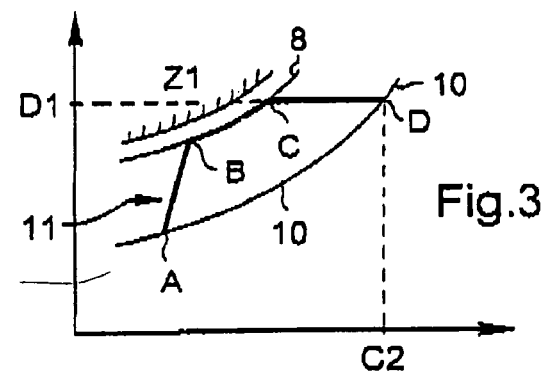
FIG. 3 is a graph for explaining how acceleration is regulated.

FIG. 3 is a graph explaining the principle on which regulation in acceleration operates. In this graph, the main modulated flow rate is plotted up the ordinate and the modulated speed of rotation is plotted along the abscissa. Although not explained with reference to a figure, the principle of operation for regulation in deceleration is identical to that described below for acceleration.

The regulation relationship 10 for normal operation and an optimum regulation relationship 8 in acceleration are shown in this figure.

In addition, the curve 11 drawn bold in FIG. 3 shows how the fuel flow rate varies during an acceleration of the engine, this period beginning, for example, at a point A and terminating at a point D. The first speed of rotation NTL is thus lower than the first setpoint as defined by the manufacturer. The regulator means 5 therefore needs to accelerate the engine in order to increase this first speed of rotation NTL.

As a result, the regulator means 5 determines a second setpoint to be reached by the second speed of rotation Ng so that the first speed of rotation NTL becomes equal to the first setpoint. On the basis of this second setpoint, the regulator means 5 uses the above formula to calculate the value C2 that is to be reached by the modulated speed of rotation Ng'. From the regulation relationship 10 in normal operation, the main modulated flow rate should then be D1. The apparatus could accelerate by following this relationship, but acceleration would then be slow and that could be problematic for flight safety.

Under such conditions, it is essential to accelerate the engine as quickly as possible.

Initially, corresponding to segment AB, the regulator means 5 increases the fuel flow rate strongly so as to reach the optimum regulation relationship 8 in acceleration as quickly as possible. During this stage of regulation, the fuel flow rate is increased by the maximum value authorized for the engine, which explains the steep slope of segment AB.

Thereafter, corresponding to segment BC, the fuel flow rate can no longer be increased as quickly as before. If it were to be increased that quickly, the shaded zone Z1 would be reached, thus leading to the engine pumping. To optimize the increase in fuel flow rate, the regulator means 5 thus determines the rate at which fuel should be delivered to the engine from the optimum regulation relationship 8 in acceleration.

Finally, from point C, the main modulated flow rate is equal to D1. The modulated speed of rotation then increases progressively and naturally, and finally reaches the value C2.

It can thus be seen that the increase in the fuel flow rate, and consequently the acceleration of the engine, has been optimized in such a manner as to take place as quickly as possible.

Figure 4:
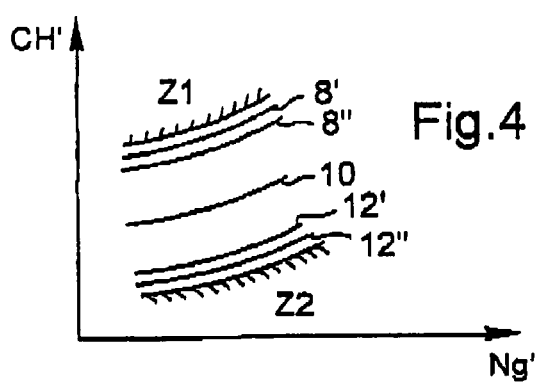
FIG. 4 is a graph showing the regulation relationship in a first embodiment.

FIG. 4 is a graph showing the regulation relationships in a first embodiment. In this embodiment, the main modulated flow rate is equal to a primary modulated flow rate.

The primary modulated flow rate is obtained using the following first relationship in which CH' represents the primary modulated flow rate, CH represents the fuel flow rate delivered to the engine, P0 represents external pressure, T0 represents external temperature, α represents a first power and β represents a second power:

$$CH' = CH\left(\frac{1013}{P0}\right)^{\alpha}\left(\frac{288}{T0}\right)^{\beta}$$

The first and second powers α and β depend exclusively on the type of engine. Experience shows that fuel flow rate regulation is optimized during acceleration with a first power α lying in the range 0.9 to 1.05, and a second power β lying in the range 0.6 to 0.9.

In addition, when the main modulated flow rate is equal to said primary modulated flow rate, there exist a plurality of optimum regulation relationships in acceleration, depending on altitude, e.g. a high altitude relationship 8' and another relationship 8" for low altitude. Similarly, there exists a plurality of optimum regulation relationships in deceleration, that are geometrically similar to the optimum regulation relationships in acceleration, and that depend on altitude, e.g. a relationship 12' for high altitude, and another relationship 12" for low altitude.

Figure 5:
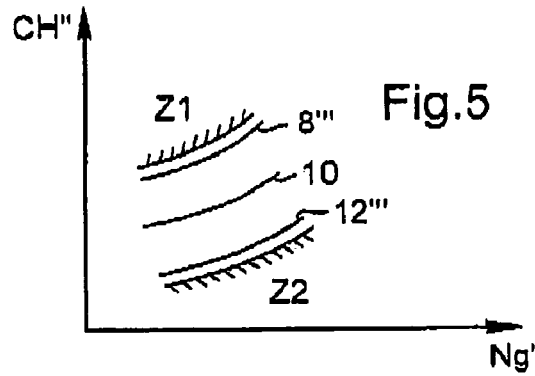
FIG. 5 is a graph showing the regulation relationship in a second embodiment.

In contrast, in a second embodiment, described with reference to FIG. 5, when the main modulated flow rate is equal to a secondary modulated flow rate, single optimum regulation relationships 8''' and 12''' are obtained respectively in acceleration or in deceleration and that are valid regardless of altitude.

Under such conditions, the secondary modulated flow rate is obtained using the following second relationship in which CH" represents the secondary modulated flow rate, CH' the primary modulated flow rate, and T0 the external temperature:

$$CH'' = CH'\left(\frac{288}{T0}\right)$$

The apparatus described above provides good control over the fuel flow rate to a turboshaft engine. Nevertheless, the optimum regulation relationship(s) is/are established on the basis of tests performed on an engine in good condition. With wear, engine performance can become degraded, thereby changing the shapes of the shaded zones Z1 and Z2. As a result, it becomes possible for pumping or engine flameout to occur. Because of this, a bottom limit and a predetermined threshold are introduced into the system in order to avoid a drawback of this type.

To avoid engine flameout, the control means 6 includes a bottom limit which ensures that it is not possible to have a fuel flow rate too small. As a safety measure, the fuel metering system is also provided with a bottom limit.

Experience shows that pumping is a phenomenon that is accompanied by a strong increase in internal temperature T4. Consequently, the regulator means 5 limits any increase in fuel flow rate when the time derivative of the internal temperature T4 reaches a value that is not less than a predetermined threshold.

Figure 6:
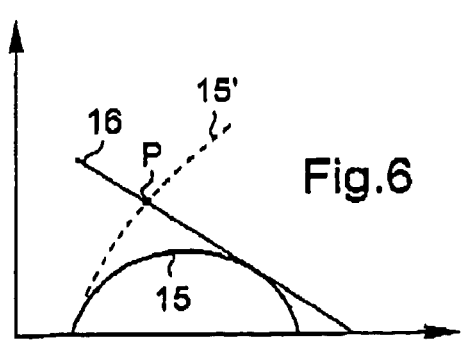
FIG. 6 is a graph showing how internal temperature T4 varies.

With reference to FIG. 6, which is a graph in which internal temperature T4 is plotted along the abscissa and the time derivative of internal temperature T4 is plotted up the ordinate, this predetermined threshold corresponds to a limit line 16 having the equation:

$$T4 + k\frac{d}{dt}(T4) = T4\text{max}$$

where k and T4 max are constants determined by testing for each turboshaft engine.

Curve 15 shows how internal temperature T4 varies in normal operation. Curve 15' shows abnormal variation in internal temperature T4 that can lead to pumping.

By comparing variation in the internal temperature T4 with the limit line 16, it is possible to predict and avoid pumping several tenths of a second before it appears. For this purpose, at point P, it is necessary to stop increasing the fuel flow rate and to define a new regulation program.

Figure 7:
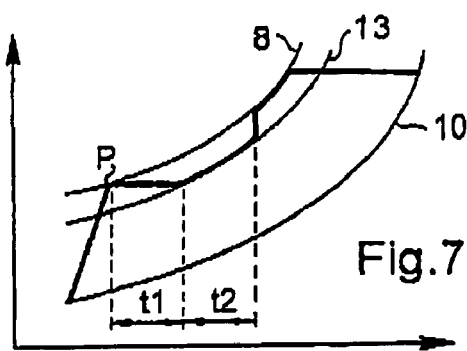
FIG. 7 is a graph for explaining the method of the invention.

FIG. 7 is a graph for explaining a method that enables the increase in the fuel flow rate to be limited when the predetermined threshold, e.g. the point P, is reached.

Initially, regulation takes place correctly. Nevertheless, at point P, it is essential to limit the fuel flow rate in order to avoid the engine pumping.

The regulator means 5 then freezes the flow rate for a first duration t1 in order to shift to a degraded regulation relationship 13.

At the end of this first duration t1, the regulator means 5 evaluates the flow rate to be delivered to the engine on the basis of the degraded regulation relationship 13 during a second duration t2.

At the end of this second duration t2, the fuel flow rate is again increased so as to be evaluated using the optimum regulation relationship 8 in acceleration. The flow rate regulation process then continues normally.

In addition, this degraded regulation relationship 13 presents the same shape as the optimum regulation relationship 8 in acceleration and remains better than the regulation relationship 10 for normal operation.

In a variant of this method, at the end of the first duration t1, the regulator means evaluate the flow rate at which fuel should be delivered to the engine on the basis of the optimum regulation relationship 8 in acceleration.

Naturally, the present invention can be subjected to numerous variations as to its implementation. Although two embodiments are described above, it will readily be understood that it is inconceivable to identify exhaustively all possible embodiments. Naturally any of the means described could be replaced by equivalent means without going beyond the ambit of the present invention.

What is claimed is:

1. A method for regulating the fuel flow rate of a turboshaft engine in acceleration or in deceleration, the engine having a free turbine and engine's gas generator, there being sensors for transmitting to regulator means information relating to a first speed of rotation of said free turbine, to a second speed of rotation of said engine's gas generator; to an internal temperature of the gas at the inlet to the free turbine, to the external pressure; and to the external temperature, there further being control means activated by said regulator means to actuate a fuel metering system of said engine; the method comprising determining the fuel flow rate to be delivered to said engine in acceleration or in deceleration equal to a main modulated flow rate which is a function of a modulated speed of rotation, said main modulated flow rate depending on the external temperature and on the external pressure, said modulated speed of rotation corresponding to the second speed of rotation of said engine's gas generator modulated by the external temperature, and then delivering said determined fuel flow rate to the engine, wherein said main modulated flow rate is equal to a primary modulated flow rate that is obtained by the following first relationship in which CH' represents said primary modulated flow rate, CH represents the fuel flow rate supplied to the engine, P0 the external pressure, T0 the external temperature, α a first power, and β a second power:

$$CH' = CH\left(\frac{1013}{P0}\right)^{\alpha}\left(\frac{288}{T0}\right)^{\beta}.$$

2. A method according to claim 1, wherein said first power α lies in the range 0.9 to 1.05.

3. A method according to claim 1, wherein said second power β lies in the range 0.6 to 0.9.

4. A method according to claim 1, wherein said control means possesses a bottom limit.

5. A method according to claim 1, wherein said control means is a stepper motor.

6. A method for regulating the fuel flow rate of a turboshaft engine in acceleration or in deceleration, the engine having a free turbine and engine's gas generator, there being sensors for transmitting to regulator means information relating to a first speed of rotation of said free turbine, to a second speed of rotation of said engine's gas generator; to an internal temperature of the gas at the inlet to the free turbine, to the external pressure; and to the external temperature, there further being control means activated by said regulator means to actuate a fuel metering system of said engine; the method comprising determining the fuel flow rate to be delivered to said engine in acceleration or in deceleration equal to a main modulated flow rate which is a function of a modulated speed of rotation, said main modulated flow rate depending on the external temperature and on the external pressure, said modulated speed of rotation corresponding to the second speed of rotation of said engine's gas generator modulated by the external temperature, and then delivering said determined fuel flow rate to the engine, and wherein said regulator mean limits the increase in said fuel flow rate when the time derivative of said internal temperature reaches a value that is not less a predetermined threshold.

7. A method according to claim 6, wherein said main modulated flow rate is equal to a primary modulated flow rate that is obtained by the following first relationship in which CH' represents said primary modulated flow rate, CH represents the fuel flow rate supplied to the engine, P0 the external pressure, T0 the external temperature, α a first power, and β a second power:

$$CH' = CH\left(\frac{1013}{P0}\right)^\alpha \left(\frac{288}{T0}\right)^\beta.$$

8. A method according to claim 6, wherein said main modulated flow rate is equal to a secondary modulated flow rate which is obtained by the following second relationship in which CH" represents said secondary modulated flow rate, CH represents the flow rate of fuel delivered to the engine, P0 represents the external pressure, T0 represents the external temperature, α represents a first power and β represents a second power:

$$CH'' = CH\left(\frac{1013}{P0}\right)^\alpha \left(\frac{288}{T0}\right)^{\beta+1}.$$

9. A method according to claim 7, wherein said first power α lies in the range 0.9 to 1.05.

10. A method according to claim 7, wherein said second power β lies in the range 0.6 to 0.9.

11. A method according to claim 6, wherein, in a graph where said internal temperature is plotted along the abscissa and said derivative of the internal temperature is plotted up the ordinate, said predetermined threshold corresponds to a limit line of equation:

$$T4 + k\frac{d}{dt}(T4) = T4\text{max}$$

where k and T4 max are constants.

12. A method according to claim 6, wherein said control means possesses a bottom limit.

13. A method according to claim 6, wherein said control means is a stepper motor.

14. A method according to claim 6 for limiting the increase in the flow rate of fuel to a turboshaft engine when said predetermined threshold is reached, wherein said regulator means freezes said fuel flow rate for a first duration when the time derivative of said internal temperature has a value not less than the predetermined threshold.

15. A method according to claim 14, wherein:
a) at the end of the first duration and during a second duration, said regulator means sets the flow rate of fuel to be delivered to said engine from at least one degraded regulation relationship; and
b) at the end of said second duration, said regulator means sets the flow rate of fuel to be delivered to said engine from said predetermined regulation relationship modulated flow rate in acceleration.

16. A method according to claim 14, wherein, at the end of said first duration, said regulator means sets the flow rate of fuel to be delivered to said engine on the basis of said predetermined regulation relationship modulated flow rate in acceleration.

* * * * *